United States Patent
Yamashita et al.

(10) Patent No.: US 7,620,395 B2
(45) Date of Patent: Nov. 17, 2009

(54) CELLULAR NETWORK ACQUISITION METHOD AND APPARATUS

(75) Inventors: Osamu Yamashita, Tokyo (JP); Richard Ormson, Berkshire (GB); Frederic Gabin, Berkshire (GB); Darioush Downer, Berkshire (GB); Nigel Legg, Berkshire (GB)

(73) Assignee: NEC Corporation, Tokyo (JP)

( * ) Notice: Subject to any disclaimer, the term of this patent is extended or adjusted under 35 U.S.C. 154(b) by 808 days.

(21) Appl. No.: 10/714,672

(22) Filed: Nov. 18, 2003

(65) Prior Publication Data
US 2004/0229610 A1 Nov. 18, 2004

(51) Int. Cl.
*H04Q 7/20* (2006.01)
(52) U.S. Cl. .................................... 455/434; 455/432.1
(58) Field of Classification Search .................. 455/434, 455/34, 67.11
See application file for complete search history.

(56) References Cited

U.S. PATENT DOCUMENTS

| 5,711,001 | A | 1/1998 | Bussan et al. | |
| 6,400,946 | B1 * | 6/2002 | Vazvan et al. | 455/432.1 |
| 2002/0049075 | A1 | 4/2002 | Takagi | |
| 2004/0058650 | A1 * | 3/2004 | Palenius et al. | 455/67.11 |
| 2004/0203745 | A1 * | 10/2004 | Cooper | 455/432.1 |
| 2004/0224684 | A1 * | 11/2004 | Dorsey et al. | 455/434 |

FOREIGN PATENT DOCUMENTS

| JP | 8-331628 A | 12/1996 |
| JP | 10-341472 A | 12/1998 |
| JP | 2002-135157 A | 5/2002 |
| JP | 2002-159042 A | 5/2002 |
| WO | WO 00/67511 | 11/2000 |
| WO | WO 02/37889 A1 | 5/2002 |
| WO | WO 02/37889 A1 * | 10/2002 |

OTHER PUBLICATIONS

Japanese Office Action dated Feb. 4, 2009 with Partial English-Language Translation.
European Search Report dated Feb. 19, 2004.
3rd Generation Partnership Project (3GPP); Technical Specification Group (TSG) Radio Access Network (RAN); Working Group 1 (WG1); Physical layer—Measurements. TS25.231 V0.3.0, Jun. 1999, Technical Specification, XP-002127381.

* cited by examiner

*Primary Examiner*—Lester Kincaid
*Assistant Examiner*—Charles Shedrick
(74) *Attorney, Agent, or Firm*—McGinn IP Law Group, PLLC

(57) ABSTRACT

The present invention provides for a cellular communications device comprising determining a most suitable cell based on a characteristic of signals received from a plurality of cells, the signals from each cell being provided over a band of frequencies, and the said determination comprising the steps of taking a series of measurements of the said characteristics for each frequency so as to obtain an average value, wherein each measurement in the said series is taken for all of the frequencies in the said band before the next measurement in the series is taken, and the said series of measurements on each frequency are equally spaced and serve to provide equal intervals therebetween for further processing of signals from network cells.

7 Claims, 1 Drawing Sheet

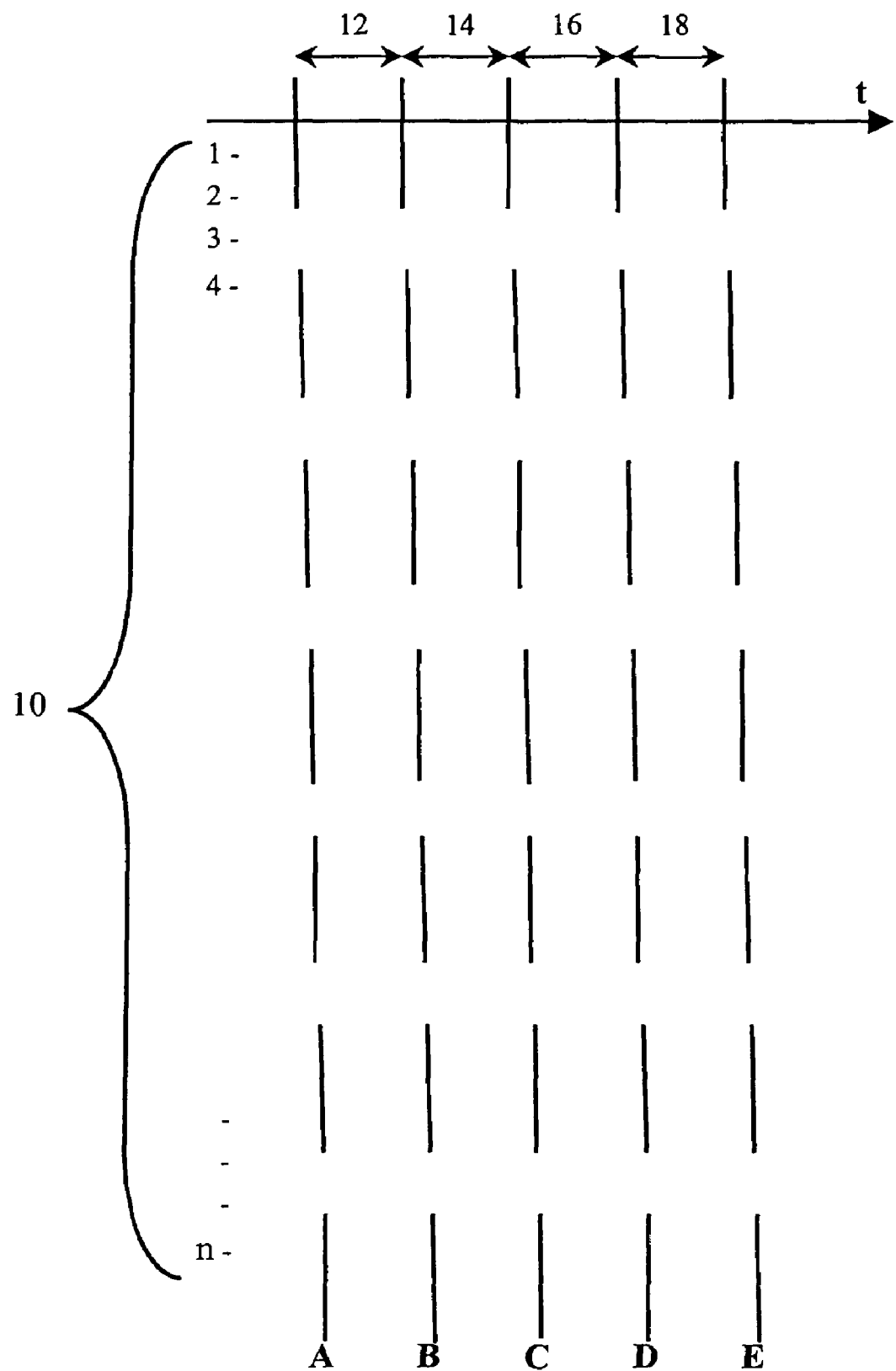

CELLULAR NETWORK ACQUISITION METHOD AND APPARATUS

BACKGROUND OF THE INVENTION

The present Invention relates to a method and apparatus for use in network acquisition for cellular communications devices.

Cellular communications devices such as cell phones, have become increasingly popular and widely adopted and in many instances have become the prime means of communication both for business and domestic requirements.

As such usage becomes more widespread, potentially disadvantageous and limiting features of such devices become more apparent. For example, when a cell phone is first turned on, an acquisition procedure needs to be conducted so that the cell phone can acquire the appropriate communications network and subsequently take part in a communications exchange over that network. The period between turning the cell phone on and actually acquiring the network does not generally go unnoticed by the user and comprises dead time as far as the user is concerned since no other operations over and above network acquisition are conducted during that period. The longer the time period required to acquire the network, the more likely this period is to be noticed by the user and so as to lead to potential irritation.

Also, network acquisition procedures require the cell phone handset to expend a significant amount of power relative to power requirements arising merely for communication procedures.

Indeed, in view of the different mobile communication modes that have arisen, and the subsequent requirement for cell phone handsets to offer dual mode, or indeed multimode, operability, it will become increasingly necessary for each handset to search on m re than one mode. Thus potential delays in network acquisition, and related user irritation, could become more frequently experienced. As explained further below network acquisition requires a search through a set of frequencies—generally defined by a frequency band in an attempt to identify the most suitable cell of a network. With dual mode operation, there will be multiple sets of frequencies to search through in order not only to find the most suitable cell, but also the most suitable network given the at least dual mode operability of the handset.

SUMMARY OF THE INVENTION

The present invention seeks to provide for a network acquisition method and apparatus which exhibits advantages over known such methods and apparatus.

According to a first aspect of the present invention, there is provided a method of network acquisition for a cellular communications device comprising determining a most suitable cell based on a characteristic of signals received from a plurality of cells, the signals from each cell being provided over a band of frequencies, and the said determination comprising the steps of taking a series of measurements of the said characteristics for each frequency so as to obtain an average value, wherein each measurement in the said series is taken for all of the frequencies in the said band before the next measurement in the series is taken, and the said series of measurements on each frequency are equally spaced and serve to provide equal intervals therebetween for further processing of signals from network cells or reception and processing of signals from cells on another network.

The present invention is advantageously based upon the realisation that, while network acquisition is generally required within a predetermined time period, the acquisition steps can be arranged so as to lead to the aforesaid equal intervals which can subsequently be used for signal processing such as that related to, for example, additional network acquisition procedures.

Insofar as such additional procedures are carried out within what was previously found to be mere dead time, the amount of dead time is in fact decreased such that, for example with regard to a dual mode handset. The speed with which acquisition procedures for both radio technology modes can be conducted is advantageously increased.

Advantageously, the said characteristic comprises signal strength, or a derivative thereof, and the number of measurements in the series required so as to arrive at the average value can be in the region of five.

In one embodiment, each of the said equal intervals can be determined to be in the region of 0.5 seconds such that, when employing a series of 5 measurements, there are four such equal intervals leading to a total additional available processing time of two seconds.

Preferably, the method can be employed within a dual mode, or multi-mode device, such that the equal intervals arising during the search on one radio technology (RAT), for example GSM, can be employed for acquisition steps relating to second RAT, for example, UMTS.

Alternatively, and in particular with a single mode device, so-called second stage search operations on cells found to have, for example, high signal strength, can be conducted during the said equal intervals.

According to another aspect of the present invention, there is provided a cellular communications device including means for determining a most suitable cell based upon a characteristic of signals received from a plurality of cells, the signals from each cell being provided over a band of frequencies, the said means for determining comprising means for taking a series of measurements of the said characteristics for each frequency so as to obtain an average value, wherein each measurement in the said series is taken for all the frequencies in the band before the next measurement in the series is taken, and such that the said series of measurements on each frequency are equally spaced so as to serve to provide equal intervals there between for the further processing signals from the network cells.

Such a device an advantageously be arranged to operate in accordance with the previously defined method steps.

BRIEF DESCRIPTION OF THE DRAWING

A diagram for illustrating acquisitions steps in accordance with a method embodying the present invention.

DESCRIPTION OF THE PREFERRED EMBODIMENT

The invention described further hereinafter, by way of example only, with reference to the accompanying drawing.

The following description relates to one example of the present invention for use in relation to a dual mode handset (or a radio communication device) which is required to operate in accordance with two RAT (Radio Access Technology)s such as, for example, GSM (Global Ssytem for Mobile Communications) and UMTS (Universal Mobile telecommunications System).

Some operating specifications, such as the current 3GPP (3rd Generation (3G) Partnership Project) specifications require that a handset search only one RAT at a time The relative priority of the different RATs is generally set within the handset. Thus, for example, with a dual mode GSM/ UMTS handset, a search of the second RAT, for example UMTS, during initial selection is only made if no suitable cells are found when searching in relation to the first RAT, such as GSM.

Such initial searching procedures are relatively simple. For example, using the strength of signals received from the cells, the cells are ranked in order of signal strength and the cell found to be at the top of the list is then accessed for suitability. If suitable, that cell, and the related RAT is effectively acquired by the handset If not, then a search of the second RAT is conducted.

The 3GPP specification requires that five measurements for each frequency within the frequency band are required to be conducted over a period of no less than 3 seconds in order to produce an average value by which the cell is ranked in accordance with the process noted above. The measurements are also required to be equally spaced.

While it has previously been thought that such requirements dictate that each of the large plurality of measurements has to be a set equal time period away from the previous measurement. The present invention takes advantage of the realisation that such requirements are not in fact necessary in practice.

In accordance with the present invention, it is realised that it is only the measurements conducted on the same frequency that need to be equally spaced and so the acquisition procedure according to the present invention is conducted merely to ensure that it is only such measurements that need be equally spaced and this serves to free-up the time that was previously taken ensuring that all measurements were equally spaced. This further time that is now available within the acquisition procedure and which no longer represents part of the dead time, is therefore available in accordance with the present invention for subsequent acquisition procedures if required.

Turning now to the drawing, there is illustrated a series of five measurements A-E taken over time t and in relation to a range of frequencies 1-n forming a frequency band 10 in accordance with a first RAT. In the example illustrated, the acquisition procedures being conducted in relation to the GSM mode and the frequency band 10 actually comprises two GSM bands, the EGSM 900 band which contains 172 frequencies, and the GSM 1800 band containing 374 frequencies. Thus, in the illustrated example, n=546 in that there are 546 different frequencies which are to be measured.

As noted above, and in accordance with the 3GPP specification, the series of five measurements A-E are to be taken over a period of no less than 3 second. Thus, the final measurement E must be taken at a period of at least t=3 seconds or more.

As discussed above, the acquisition procedure is arranged such that it is only the spacings 12, 14, 16, 18 between the series measurements that are equal since, in accordance with the present invention, each of the 546 measurements taken against the frequencies in band and forming the first measurement in the series A do not need to be equally spaced.

Thus, in operation, the first measurement in the series A is taken for all 546 frequencies before the procedure moves to the second measurement B in the series. Since equal spacing between all of the 546 measurements forming the first measurement A in the series is not required, the invention can simply operate to ensure that the 546 measurements are taken as quickly as possible.

It is identified that it takes approximately 350 μs is to tune to a particular frequency and perform a measurement. Thus, in relation to the entire frequency band 10 for the EGSM 900 and GSM 1800 bands, it will take a total of 0.19 seconds to perform each of the required measurement that is it will effectively take 0.19 seconds to perform each of the five series of measurements A-E shown in the drawings.

However, and as discussed above, in order to arrive at an average value, five measurements per frequency are taken, i.e. the five measurements A-E illustrated in the drawing, and so this increases the total time required to arrive at the average value on each of the 546 frequencies to 0.95 seconds.

However, insofar as there is a minimum of 3 seconds required to arrive at the final measurements E in the series, and only 0.95 second of this 3 second period is in fact used in the frequency measurement, this leaves just over 2 seconds of the 3 seconds period defined in accordance with the 3GPP specification that can be employed for other purposes.

Returning to the particular requirement of the present invention, i.e. that it is only the spacings 12, 14, 16 and 18 that need to be of equal length, and given that an available period of just over 2 seconds is identified, it arises that each of the spacings 12-18 can be in the order of 0.5 seconds.

Periods of such length can be advantageously employed for further signal processing activity.

As one example and in a dual-mode handset, the four periods of 0.5 seconds can be arranged to search the other of the two RATs. For example, since UMTS has a similar searching averaging requirement to GSM, the UMTS measurements can be placed within the 0.5 second intervals 12-18 arising during the GSM operation and the GSM averaging requirements can still be met. It is then possible to draw up a combined list of GSM and UMTS cells to be considered for cell selection. This can prove particularly advantageous in that a choice can then be made to select either of the two modes and m a manner which requires a time period comparable with that currently known merely to search on one RAT.

As a second example, and one that arises in relation to a single mode phone, the second stage search operations on the cells found have high signals after the initial batch of measurements can be conducted during the 0.5 second periods 12-18. Such operations would normally be performed once the previously mentioned averaging stages have been completed.

However, if an Initially strong signal is located, there is no particular disadvantage in attempting to read the signal even the signal strength may not yet have been averaged. Again, this can lead to a vastly more efficient use of the acquisition period so as to lead to time saving and reduction in dead time experienced by the user.

It should however be appreciated that the invention is not restricted to the details of the foregoing embodiments For example the invention can be employed within multi-mode handsets for any two or more appropriate RATs and the equal spacing between the series of measurements can comprise different values from those noted above particularly when determined in accordance with different operating specifications.

What is claimed is:

1. A method of determining a most suitable cell during network acquisition for a cellular communications device, based on a characteristic of signals received from a plurality of cells, the signals from each cell being provided over a band of frequencies, said method comprising: taking a series of measurements of said characteristics by said cellular communication device for each frequency of a first frequency band, so as to obtain an average measurement value of said characteristic for each frequency of said first frequency band, wherein the series of measurements on said first frequency band are equally spaced in time, with equal time intervals therebetween; and during the time intervals between measurements for said first frequency band, taking a series of measurements of said characteristic for each frequency of a second frequency band, wherein said first and second frequency bands operate in different operating modes, wherein said series of measurements on said first frequency band that is equally spaced in time is repeated a predetermined number of times to calculate said average measurement for each said frequency, wherein, before a completion of said predetermined number of times occurs and before said average measurement value is obtained, a second stage search operation processing is initiated for at least one detected strong signal.

2. A method as claimed in claim 1 wherein one operating mode comprises GSM, and the other operating mode comprises UMTS.

3. A cellular communications device including means for determining a most suitable cell during network acquisition for a cellular communications device, based upon a characteristic of signals received from a plurality of cells, the signals from each cell being provided over a band of frequencies, said cellular communications device comprising: a first unit for taking a series of measurements of said characteristics for each frequency of a first frequency band, so as to obtain an average measurement value of the characteristic for each frequency of the first frequency band, wherein the series of measurements on the first frequency band are equally spaced in time, with equal time intervals therebetween; and a second unit for taking a series of measurements of the characteristic for each frequency of a second frequency band during the time intervals between measurements for the first frequency band, wherein said first and second frequency bands operate in different operating modes, wherein said first unit and said second unit take said series of measurements on said first frequency band and said second frequency band a predetermined number of times to calculate said average measurement for each said frequency in said first frequency band, wherein before a completion of said predetermined number of times occurs and before said average measurement value is obtained, a second stage search operation processing is initiated for at least one detected strong signal.

4. A device as claimed in claim 3 wherein one operating mode comprises GSM, and the other operating mode comprises UMTS.

5. A method of determining a most suitable cell and a most suitable mode for a cellular communication device capable of operating in at least two modes, each operating mode having a plurality of frequencies occupying a frequency band, said method comprising: selectively, for each time period of a predetermined number of successive time periods, said cellular communication device sequentially taking measurements of a characteristic for each frequency of each frequency band for each operating mode said cellular communication device is capable, each said time period being equal in time; calculating an average value of said characteristic for each frequency of each frequency band; and selecting said most suitable cell and said most suitable mode based upon said average values, wherein, before a completion of said predetermined number of times occurs and before said average measurement value is obtained, a second stage search operation processing is initiated for at least one detected strong signal wherein before a completion of said predetermined number of times occurs and before said average measurement value is obtained, a second stage search operation processing is initiated for at least one detected strong signal.

6. The method of claim 5, wherein said characteristic comprises a signal strength.

7. The method of claim 5, wherein one operating mode comprises GSM and another operating mode comprises UMTS.

* * * * *